United States Patent Office 3,350,449
Patented Oct. 31, 1967

3,350,449
4,4′-DIAMINO-N-METHYL-DIPHENYL-AMINES
Edward L. Wheeler, Woodbury, Conn., assignor to Uniroyal, Inc., a corporation of New Jersey
No Drawing. Filed Sept. 25, 1963, Ser. No. 311,315
The portion of the term of the patent subsequent to Aug. 9, 1983, has been disclaimed and dedicated to the Public
3 Claims. (Cl. 260—576)

This invention relates to new chemicals which are antiozonants for rubber and to their use in inhibiting the deteriorating effect of ozone on rubber.

It is known that ozone causes surface cracking of conventional rubber vulcanizates when the rubber is under strain. The most severe deterioration occurs when a small number of cracks are formed which grow rapidly at the expense of the formation of new cracks. Such a condition will produce deep, disruptive fissures which seriously shorten the serviceable life of the article. Waxes have been utilized to inhibit ozone cracking in articles under static stress by milling them into the rubber stock before vulcanization; the wax migrates to the surface of the rubber article to form a film which acts as a physical barrier to ozone attack. However, if the article is subjected to dynamic flexing during service the wax film breaks and the article cracks worse than if no wax had been incorporated.

Chemical antioxonants have been developed which retard the formation of ozone cracks during both static and dynamic conditions. Examples of antiozonants now being used are N - isopropyl-N′-phenyl - p - phenylenediamine, N - cyclohexyl - N′ - phenyl - p - phenylenediamine, N,N′ - dioctyl - p - phenylenediamine, 6 - ethoxy - 1,2-dihydro-2,2,4-trimethylquinoline and nickel dibutyldithiocarbamate.

I have discovered a new class of organic compounds which are antiozonants for rubber. The compounds have the general formula

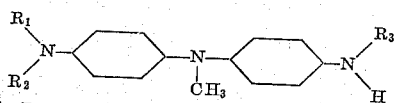

in which $R_1$, $R_2$ and $R_3$ are alkyl radicals having 1 to 8 carbon atoms or cycloalkyl radicals having 5 to 8 carbon atoms. The chemicals of the present invention are also antioxidants for rubber. The chemicals of the present invention are used as antioxonants and antioxidants for rubber in amounts from 0.1 to 5 parts by weight per 100 parts of rubber.

The chemicals of the present invention may be prepared by reductively alkylating the selected 4-disubstituted amino-4′-nitro-N-methyldiphenylamine in which the amino substituents are $R_1$ and $R_2$ in the above general formula with the selected ketone in the presence of hydrogen and a suitable hydrogenation catalyst such as palladium-on-charcoal. The 4-disubstituted amino-4′-nitro-N-methyldiphenylamine is prepared by methylating the corresponding 4-disubstituted amino-4′-nitrodiphenylamine with a suitable methyl ester such as dimethyl sulfate. The 4-disubstituted amino-4′-nitrodiphenylamine is prepared by condensing the selected N,N-dihydrocarbyl-N′-formyl-p-phenylenediamine in which the hydrocarbyl radicals are $R_1$ and $R_2$ in the above general formula with p-nitrochlorobenzene. This is illustrated in Example 1 below.

The chemicals of the present invention where $R_1$, $R_2$ and $R_3$ are the same may also be prepared by reductively alkylating 4,4′-diamino-N-methyldiphenylamine or 4,4′-dinitro-4-methyldiphenylamine with the selected aldehyde in the presence of hydrogen using a hydrogenation catalyst such as palladium-on-charcoal. The 4,4′-diamino-N-methyldiphenylamine is prepared in known manner by reducing 4,4′-dinitro-N-methyldiphenylamine by hydrogenation in the presence of a suitable catalyst such as nickel, copper chromite, platinum, rhodium or palladium. This is illustrated in Example 2 below.

Examples of the chemicals of the present invention are:

4-dimethylamino-4′-isopropylamino-N-methyldiphenylamine
4-di-n-octylamino-4′-n-octylamino-N-methyldiphenylamine
4-diethylamino-4′-cyclohexylamino-N-methyldiphenylamine
4-di-n-butylamino-4′-(sec-butylamino)-N-methyldiphenylamine
4-diethylamino-4′-(2-octylamino)N-methyldiphenylamine
4-(N-isopropyl-N-n-octylamino)-4′-isopropylamino-N-methyldiphenylamine
4-dimethylamino-4′-(1,3-dimethylbutylamino)-N-methyldiphenylamine
4-(N-cyclohexyl-N-methylamino)-4′-cyclohexylamino-N-methyldiphenylamine
4-(di-n-amylamino)-4′-n-heptylamino-N-methyldiphenylamine
4-dimethylamino-4′-cyclopentylamino-N-methyldiphenylamine Examples 1 and 2 illustrate the preparation of the chemicals of the present invention.

*Example 1.—4-dimethylamino-4′-isopropylamino-N-diphenylamine*

Into a 1.7-liter rocking autoclave were charged 61.0 grams (0.225 mole) of 4-dimethylamino-4′-nitro-N-methyldiphenylamine, 540 ml. of acetone and 6 grams of 5% palladium-on-carbon. The contents while agitated were subjected to 300–500 p.s.i. gauge pressure of hydrogen at 30–65° C. for 1¼ hours at 65° C. for one hour. The cooled hydrogenation charge was removed and the catalyst filtered off. The residue product 4-dimethylamino-4′-isopropylamino-N-methyldiphenylamine was distilled at 190–199° C. (0.4 mm.).

*Analysis.*—Calculated for $C_{18}H_{25}N_3$: C, 76.3; H, 8.89; N, 14.83. Found: C, 76.0; H, 8.96; N, 14.90.

The 4 - dimethylamino - 4′ - nitro - N - methyldiphenylamine was prepared as follows: 4 - dimethylamino - 4′ - nitrodiphenylamine (90 grams; 0.35 mole), potassium carbonate (280 grams) and acetone (560 ml.) were mixed and heated to the reflux temperature. Dimethyl sulfate (105 grams) was added slowly. After refluxing the mixture for four hours the copious yellow precipitate was filtered and dried. This quaternary salt melted at 259–261° C. The salt was boiled in aqueous sodium hydroxide suspension to give a brown quaternary hydroxide which in turn was heated at the melting point (151° C.) for one hour. Decomposition of the quaternary hydroxide gave the desired intermediate 4-dimethylamino - 4′ - nitro - N - methyldiphenylamine which was recrystallized from ethanol; M.P. 140.8–141.7° C.

*Analysis.*—Calculated for $C_{15}H_{17}N_3O_2$: C, 66.4; H, 6.32; N, 15.49. Found: C, 66.2; H, 6.40; N, 15.50.

The 4 - dimethylamino - 4' - nitrodiphenylamine was prepared as follows: Into a 2 liter 3-neck flask equipped with a thermometer, stirrer, and a Stark and Dean trap filled with benzene, were added 295 g. of N,N - dimethyl - N' - formyl - p - phenylenediamine (Beil. XIII, 94), 236 g. of p - nitrochlorobenzene, 150 g. of anhydrous potassium carbonate, and 150 ml. of dimethylformamide. The mixture was heated at 160–170° C. for 5½ hours with continuous removal of the water formed in the reaction. The reaction mixture was cooled, poured into water, and the resulting precipitate filtered, washed successively with dilute hydrochloric acid, ethanol, and finally with a mixture of hot benzene and hexane. 222 g. of 4 - dimethylamino - 4' - nitrodiphenylamine was obtained, M.P. 145–150° C. Recrystallization of the product from nitromethane yielded material with a melting point of 151.0–152.5° C.

*Analysis.*—Calculated for $C_{14}H_{15}N_3O_2$: C, 65.4; H, 5.88; N, 16.3. Found: C, 65.3; H, 6.08; N, 16.2.

*Example 2.—4 - di - n - octylamino - 4' - n - octylamino-N - methyldiphenylamine*

Into a 1.7-liter rocking autoclave were charged 42.6 g. of 4,4' - diamino - N - methyldiphenylamine, 102 g. of n - octaldehyde, 430 ml. of isopropanol, and 3.0 g. of 5% palladium-on-charcoal catalyst. The mixture, while agitated, was subjected to 350–400 p.s.i. gauge pressure of hydrogen at 150° C. for 3¾ hours. The catalyst was separated from the cooled reaction mixture by filtration, and the solvent was removed by distillation. The residue after vacuum topping weighed 129 gms. Chromatographic separation of a portion of the residue on alumina followed by infrared spectral and nitrogen analyses of the various fractions indicated the residue contained approximately ⅓ of 4 - di - n - octylamino-4' - n - octylamino - N - methyldiphenylamine. If desired, the 4,4' - dinitro - N - methyldiphenylamine may be reductively alkylated with n - octaldehyde in a similar manner to the 4,4' - diamino - N - methyldiphenylamine to give the 4 - di - n - octylamino - 4' - n - octylamino-N - methyldiphenylamine.

The 4,4' - dinitro - N - methyldiphenylamine was prepared as follows: Into a 500 ml. 3-neck flask equipped with a thermometer, stirrer, and a Stark and Dean trap filled with benzene, were charged 72 g. of p - nitro - N-methylaniline, 78 g. of p - nitrochlorobenzene, 69 g. of potassium carbonate, and 70 ml. of dimethylformamide. The mixture was heated at 160–170° C. for 29 hours with continuous removal of the water formed. The mixture was cooled, quenched with water, and the resulting precipitate filtered. The precipitate was digested with dilute hydrochloric acid on the steam bath, then after filtering, was treated with hot ethanol. The alcohol insoluble material was filtered. This product was then dissolved in chloroform and filtered. The product was recovered by evaporation of the chloroform to yield 110 g. (86% yield) of 4,4' - dinitro - N - methyldiphenylamine, M.P. 174–176° C. The product melted at 178–179° C. after recrystallization from aqueous dimethylformamide [see J. Am. Chem. Soc. 74, 1321 (1952)].

The 4,4' - diamino - N - methyldiphenylamine was prepared by reducing the 4,4' - dinitro - N - methyldiphenylamine by hydrogenation in isopropanol at 100° C. and 200–400 p.s.i. gauge pressure of hydrogen in the presence of a palladium-on-charcoal catalyst. The 4,4'-diamino - N - methyldiphenylamine was isolated by removing the catalyst by filtration and evaporating the solvent. The chemical melted at 172.5–174° C. after recrystallization from an ethanol-water mixture.

The chemicals of the present invention are antiozonants for rubbers, such as natural rubber and synthetic rubbers, and mixtures thereof. The synthetic rubbers may be the products of aqueous emulsion polymerizations with a peroxide catalyst of various rubber-forming monomers. Such synthetic rubbers may be polymers of butadienes - 1,3, e.g. butadiene - 1,3, 2-methylbutadiene -1,3 (isoprene) 2 - chlorobutadiene-1,3 (chloroprene), 2,3 - dimethylbutadiene - 1,3, piperylene, and copolymers of mixtures thereof, and copolymers of mixtures of one or more such butadienes - 1,3 with up to 70% of such mixtures of one or more monoethylenic compounds which contain a $CH_2=<$ group where at least one of the disconnected valences is attached to an electro-negative group, that is a group which substantially increases the electrical dissymmetry or polar character of the molecule. Examples of such monoethylenic compounds which are copolymerizable with butadienes 1,3, are aryl olefins, such as styrene, vinyl naphthalene, alpha methyl styrene, para chloro styrene, dichloro styrene, alpha methyl dichloro styrene; the alpha methylene carboxylic acids and their esters, nitriles and amides, such as acrylic acid, methyl acrylate, methyl methacrylate, acrylonitrile, methacrylonitrile, methacrylamide; methyl vinyl ether; methyl vinyl ketone; vinylidene chloride; vinyl pyridines, such as 2-vinyl pyridine, 2 - methyl - 5 - vinyl pyridine; vinyl carbazole. Commercial synthetic rubbers of this type are SBR (copolymer of a major proportion of butadiene and a minor proportion of styrene) and NBR (copolymer of a major proportion of butadiene and a minor proportion of acrylonitrile). The synthetic rubber may also be a 1,4 - polybutadiene or a 1,4 - polyisoprene, prepared by solution polymerization. Such 1,4 - polybutadiene may be made by solution polymerization of butadiene - 1,3 in the presence of a catalyst reaction product of an aluminum trialkyl, such as aluminum triethyl, and titanium iodide. Such 1,4 - polyisoprene may be made by solution polymerization of isoprene in the presence of a catalyst reaction product of an aluminum trialkyl, such as aluminum triisobutyl, and titanium tetrachloride. The synthetic rubber may also be the product of the solution polymerization of a mixture of a major proportion of isoolefin and a minor proportion of conjugated diene at low temperature in the presence of a Friedel-Crafts polymerization catalyst of the type of aluminum chloride or boron trifluoride. An example of a commercial synthetic rubber of this type is butyl rubber which is a copolymer of about 95 to 99 parts of isobutylene and correspondingly 5 to 1 parts of isoprene. The synthetic rubber may also be the product of the solution polymerization of a mixture of ethylene and at least one alpha olefin having the formula $CH_2=CHR$ in which R is an alkyl radical having 1 to 8 carbon atoms, e.g. propylene, with, if desired, a minor proportion of a non-conjugated diene, such as 1,4 - hexadiene or dicyclopentadiene, in the presence of a catalyst reaction product of aluminum trialkyl, and titanium tetrahalide or vanadium tetrahalide or vanadium oxytrihalide, e.g. the reaction product of aluminum tridecyl and vanadium oxytrichloride. An example of a synthetic rubber of this type is a terpolymer of about 55% propylene, 41% ethylene and 4% 1,4 - hexadiene.

The new antiozonants may be used in combination with waxes and other antiozonants. They may be used in rubber stocks with the usual compounding ingredients, e.g., vulcanizing agents, accelerators, activators, retarders, antioxidants, softeners, and reinforcing agents.

Examples 3 to 6 illustrate the effectiveness of the chemicals of the present invention as antiozonants and antioxidants for rubber.

*Example 3*

Compounds of the present invention were evaluated for their antiozone activity in a modification of the test of A. D. Delman, B. B. Simms and A. R. Allison as described in Analytical Chemistry, vol. 26, 1589 (1954). In this test the ability of the compounds to retard the scission of rubber molecules in solution by ozone is determined by measuring the percent of initial viscosity of the polymer solution retained after successive periods of subjection to a regulated stream of ozone of constant concentration. It has been well demonstrated that there is a correlation between the results of this test and actual rubber tests, taking into account such factors as the reactivity of the test compound with the other rubber compounding ingredients, loss by volatility, rates of migration of the chemical, etc. In the modification of the test by which the compounds of this invention were evaluated, a solution of 1.25 grams of SBR (copolymer of about 77 parts by weight of butadiene and 23 parts by weight of styrene) previously extracted with a mixture of ethylene-toluene-water in the ratio 50:40:10, and 0.125 gram of test compound in 250 ml. of o-dichlorobenzene was ozonized at room temperature with a stream of air containing 250 p.p.m. of ozone by volume at a rate of 0.02 cubic meter per hour. The measurements of the viscosity of the solutions at 30° C. were made before the start of the ozonization and after each hour for six hours, and from these data the percent of initial viscosity retained after each hour was calculated. The results are given in the following table.

| Chemical | Percent Initial Viscosity Retained After— | | | |
|---|---|---|---|---|
| | 1 hr. | 2 hr. | 3 hr. | 4 hr. |
| 4-dimethylamino-4'-isopropylamino-N-methyldiphenylamine | 94.8 | 87.7 | 76.4 | 58.0 |
| 4-di-n-octylamino-4'-n-octyl-amino-N-methyldiphenylamine | 86.3 | 62.8 | 34.5 | 14.6 |
| None | 36.2 | 16.8 | | |

Example 4

The ability of 4-dimethylamino-4'-isopropylamino-N-methyldiphenylamine to retard the formation of ozone cracks in cured rubber was determined in the following recipe for the rubber stock.

| | Parts by weight |
|---|---|
| SBR 1500 (copolymer of about 77 parts by weight of butadiene and 23 parts by weight of styrene) | 100.0 |
| Zinc oxide | 3.0 |
| HAF carbon black | 40.0 |
| EPC carbon black | 10.0 |
| Stearic acid | 1.5 |
| Saturated polymerized petroleum hydrocarbon plasticizer (Para-Flux 2016) | 3.5 |
| Naphthenic type oil (Circo Light Process Aid) | 3.5 |
| N-cyclohexyl-2-benzothiazolesulfenamide | 1.25 |
| Sulfur | 2.0 |
| Antiozone test chemical | 2.0 |

Looped test specimens of the stock cured for 45 minutes at 292° F. were prepared according to Procedure B (Exposure of Looped Specimens) of ASTM Method D518-57T (Resistance to Surface Cracking of Stretched Rubber Compounds). Specimens were subjected to outdoor exposure on a roof at an angle of 45 degrees facing south. The specimens were obserbed after appropriate intervals on the roof, and the time recorded to the appearance of cracks corresponding to those having a rating number of 3 in ASTM Method D1171-59 (Test for Weather Resistance Exposure of Automotive Rubber Compounds).

It took 96 days for the compound containing the 4-dimethylamino-4'-isopropylamino-N-methyldiphenylamine to crack to a rating number of 3 whereas the control compound without the 4-dimethylamino-4'-isopropylamino-N-methyldiphenylamine took only 4 days to crack to a rating number of 3.

Example 5

In a dynamic flexing test, molded stocks of the recipe of Example 4, ½" x 6" x ¼" having a ⅛" radius circular groove across the center were cured for 45 minutes at 292° F. They were mounted outdoors facing south and flexed through a 78 degree angle at about 8.5 kilocycles per hour. Observations were made after appropriate intervals and the number of kilocycles recorded to the appearance of cracks corresponding to those having a rating number of 3 in ASTM Method D1171-59. Both unaged stocks and stocks which had been heat aged at 158° F. for 7 days were tested. The number of kilocycles required to crack to a rating number of 3 for the control unaged stock containing no antiozone test chemical was 840 whereas the unaged stock containing 2 parts of the chemical of Example 1 required 42,303 kilocycles and the unaged stock containing 2 parts of the crude compound of Example 2 required 2205 kilocycles to crack to a rating number of 3. The number of kilocycles required to crack to a rating number of 3 for the control aged stock containing no antiozone test chemical was 2260, whereas the aged stock containing 2 parts of the chemical of Example 1 required 37,600 kilocycles to crack to a rating number of 3.

Example 6

The ability of the chemicals of the present invention to inhibit the oxidation of natural rubber was determined in the following recipe:

| | |
|---|---|
| Smoked sheets | 100.0 |
| Zinc oxide | 5.0 |
| ISAF carbon black | 45.0 |
| Pine tar | 4.5 |
| Stearic acid | 4.5 |
| N-cyclohexyl-2-benzothiazolesulfenamide | 0.5 |
| Sulfur | 2.5 |
| Antioxidant test chemical | 2.0 |

The rubber stocks were cured for 60 minutes at 292° F. The retention of tensile strength after aging in oxygen for 96 hours at 70° C. demonstrates the effectiveness of these chemicals as antioxidants. The results are shown in the following table.

| Chemical | Tensile Strength | | |
|---|---|---|---|
| | Lbs./sq. in. | | Percent Retained |
| | Unaged | Aged | |
| Chemical of Example 1 | 4,100 | 1,700 | 41 |
| Crude Chemical of Example 2 | 4,050 | 710 | 17 |
| None | 4,120 | 340 | 8 |

It may be seen from the above that the chemicals of the present invention are also antioxidants for rubber.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. A compound having the general formula

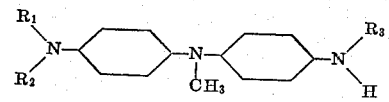

in which $R_1$ is a methyl group, a secondary alkyl group having from 3 to 8 carbon atoms, or a cycloalkyl group having from 5 to 8 carbon atoms; $R_2$ is a methyl group; and $R_3$ is a secondary alkyl group having from 3 to 8 carbon atoms or a cycloalkyl group having from 5 to 8 carbon atoms.

2. The compound of claim 1 wherein $R_1$ is a methyl group.

3. 4-dimethylamino-4'-isopropylamino-N-methyl-diphenylamine.

References Cited

UNITED STATES PATENTS

| | | | |
|---|---|---|---|
| 2,494,059 | 1/1950 | Ruggles | 260—576 |
| 3,265,736 | 8/1966 | Wheeler | 260—576 |

OTHER REFERENCES

Neunhoeffer et al., Chemical Abstracts, vol. 53, pages 10083–84 (1959).

Pachter et al., Jour. American Chemical Soc., vol. 74, pages 1321–2 (1952).

CHARLES B. PARKER, *Primary Examiner.*

R. V. HINES, *Assistant Examiner.*